US008243028B2

(12) United States Patent
Hildebrandt et al.

(10) Patent No.: US 8,243,028 B2
(45) Date of Patent: Aug. 14, 2012

(54) ERASER ASSEMBLIES AND METHODS OF MANUFACTURING SAME

(75) Inventors: Peter W. Hildebrandt, Duluth, GA (US); James D. Watson, Duluth, GA (US); Ning Hui, Johns Creek, GA (US)

(73) Assignee: Polyvision Corporation, Suwanee, GA (US)

( * ) Notice: Subject to any disclaimer, the term of this patent is extended or adjusted under 35 U.S.C. 154(b) by 962 days.

(21) Appl. No.: 12/138,759

(22) Filed: Jun. 13, 2008

(65) Prior Publication Data
US 2009/0309839 A1    Dec. 17, 2009

(51) Int. Cl.
*G06F 3/041* (2006.01)
(52) U.S. Cl. .................................................. 345/173
(58) Field of Classification Search .............. 345/156, 345/173, 176, 179; 356/400; 359/844; 455/566; 178/18, 19, 19.02; 428/304; 382/186; 725/109; 401/195; 850/1; 206/214
See application file for complete search history.

(56) References Cited

U.S. PATENT DOCUMENTS

| | | | |
|---|---|---|---|
| 4,317,956 A | 3/1982 | Torok et al. | |
| 4,670,751 A | 6/1987 | Enokido et al. | |
| 4,751,584 A | 6/1988 | Midorikawa | |
| 4,883,926 A | 11/1989 | Baldwin | |
| 5,023,408 A | 6/1991 | Murakami et al. | |
| 5,134,388 A * | 7/1992 | Murakami et al. | 345/173 |
| 5,248,856 A | 9/1993 | Mallicoat | |
| 5,401,916 A | 3/1995 | Crooks | |
| 5,475,401 A | 12/1995 | Verrier et al. | |
| 5,525,764 A | 6/1996 | Junkins et al. | |
| 5,570,190 A * | 10/1996 | Terawaki et al. | 356/400 |
| 5,654,529 A | 8/1997 | Yeung et al. | |
| 5,831,601 A | 11/1998 | Vogeley et al. | |
| 5,866,856 A | 2/1999 | Holtzman | |
| 6,310,615 B1 * | 10/2001 | Davis et al. | 345/173 |
| 6,326,565 B1 | 12/2001 | Holtzman et al. | |
| 6,373,003 B1 | 4/2002 | Holtzman | |
| 6,498,604 B1 | 12/2002 | Jensen | |
| 6,517,266 B2 | 2/2003 | Saund | |
| 6,650,320 B1 | 11/2003 | Zimmerman | |
| 6,667,739 B2 | 12/2003 | Atwood et al. | |
| 6,686,579 B2 | 2/2004 | Fagin et al. | |
| D500,790 S | 1/2005 | Jaakkola | |

(Continued)

FOREIGN PATENT DOCUMENTS
WO     WO 0025293     5/2000
(Continued)

OTHER PUBLICATIONS

International Search Report and Written Opinion Dated Oct. 30, 2009 for PCT Application No. PCT/US2009/047194.

(Continued)

*Primary Examiner* — Quan-Zhen Wang
*Assistant Examiner* — Lin Li
(74) *Attorney, Agent, or Firm* — Alicia L. W. Brewster, Esq.; Ryan A. Schneider, Esq.; Troutman Sanders LLP

(57) ABSTRACT

An eraser assembly for erasing a display surface of an electronic display system, where the display surface can implement a dot pattern. The eraser assembly can comprise a body assembly, which can be in communication with an eraser pad and a sensing device, such as a camera. The camera can be adapted to view the display surface when the eraser pad is in use.

28 Claims, 11 Drawing Sheets

U.S. PATENT DOCUMENTS

| | | |
|---|---|---|
| 6,948,210 B1 | 9/2005 | Shah |
| 7,009,594 B2 | 3/2006 | Wang et al. |
| 7,109,979 B2 | 9/2006 | Moyne et al. |
| 7,257,255 B2 | 8/2007 | Pittel |
| 7,262,764 B2 | 8/2007 | Wang et al. |
| 7,268,774 B2 | 9/2007 | Pittel et al. |
| 7,342,575 B1 | 3/2008 | Hartwell et al. |
| 7,355,584 B2 | 4/2008 | Hendriks et al. |
| 2001/0006383 A1 | 7/2001 | Fleck et al. |
| 2001/0050677 A1* | 12/2001 | Tosaya .................. 345/173 |
| 2004/0047505 A1 | 3/2004 | Ghassabian |
| 2004/0070616 A1 | 4/2004 | Hildebrandt et al. |
| 2004/0140964 A1 | 7/2004 | Wang et al. |
| 2005/0020303 A1 | 1/2005 | Chan |
| 2005/0136238 A1 | 6/2005 | Lindsay et al. |
| 2006/0053975 A1 | 3/2006 | Shibahashi et al. |
| 2006/0139338 A1 | 6/2006 | Robrecht et al. |
| 2006/0176269 A1 | 8/2006 | Bergman et al. |
| 2006/0250381 A1 | 11/2006 | Geaghan |
| 2007/0098481 A1 | 5/2007 | Hunter |
| 2007/0126716 A1 | 6/2007 | Haverly |
| 2007/0285405 A1* | 12/2007 | Rehm .......................... 345/173 |
| 2007/0296710 A1* | 12/2007 | Tseng et al. .................. 345/176 |
| 2008/0052750 A1 | 2/2008 | Grunnet-Jepsen et al. |
| 2008/0230407 A1* | 9/2008 | Lamas ........................ 206/214 |
| 2010/0017921 A1* | 1/2010 | Rangelow et al. ................ 850/1 |

FOREIGN PATENT DOCUMENTS

| | | |
|---|---|---|
| WO | WO 0116872 | 3/2001 |
| WO | WO 0135329 | 5/2001 |
| WO | WO 0163550 | 8/2001 |
| WO | WO 0233528 | 4/2002 |
| WO | WO 2005010634 | 2/2005 |
| WO | WO 2007107640 | 9/2007 |
| WO | WO 2007144850 | 12/2007 |

OTHER PUBLICATIONS

Carlson, Jeff, "Whiteboard Capture Devices", Macworld, vol. 20, No. 3, pp. 1-3, Mar. 2003.

* cited by examiner

ERASER ASSEMBLIES AND METHODS OF MANUFACTURING SAME

BACKGROUND

Various aspects of the present invention relate to electronic writing systems and, moreover, to eraser assemblies for electronic writing systems.

It is known to digitize handwriting on a surface, such as a piece of paper, by determining how a pen is moved. A position-coding pattern for coding coordinates of points can be provided on the surface. The pen can be provided with a sensor for recording the position-coding pattern locally at the tip of the pen as the pen is moved across the surface. A processing unit, which can be placed in the pen or at a distance therefrom, can decode the recorded position-coding pattern by analyzing the portion of the pattern viewed by the sensing device. As a result, movement of the pen across the surface can be determined as a series of coordinates.

For example, there exists a method of determining coordinates from a dot pattern on a piece of paper. Each set of six-by-six dots accurately defines a single coordinate. A pen containing a sensing device can view the dots and, thereby, calculate the coordinate at which the pen is positioned. For example, International Patent Publication No. WO 01/26032 and U.S. Pat. No. 7,249,716 describe such dot patterns.

Conventional electronic whiteboard systems do not currently implement dot patterns.

Conventional electronic whiteboard systems do, however, provide erasers for erasing digital markings of a pen or stylus. But currently, electronic erasers for such systems come with a number of disadvantages.

Rectangular erasers are provided for conventional non-electronic whiteboards. Rectangular erasers are beneficial because they allow a user to erase either a large swath or a smaller portion with a single stroke, depending on how the eraser is oriented in the plane of the whiteboard surface.

On the other hand, electronic whiteboard systems generally implement circular erasers. Rectangular erasers, while beneficial, would require the electronic whiteboard system to determine the orientation as well as the placement of the eraser, as the area of erasure depends on both these variables. In contrast, orientation of a circular eraser is irrelevant because a circle covers the same space regardless of orientation. The user of an electronic whiteboard system with a circular eraser, however, may not be able to vary the size of the area erased in a single stroke.

With standard whiteboard erasers, the user can tip the eraser against the whiteboard surface, so that an angle greater than zero exists between the surface and the eraser pad. Tipping can result in erasure of an even smaller swath than can be otherwise erased. With most electronic whiteboards, however, tipping the eraser causes undesirable effects. For example, the whiteboard system may not recognize that erasure is desired, or may incorrectly determine the position, orientation, or both, of the eraser.

SUMMARY

There is a need in the art for an improved eraser for an electronic display system, such as an electronic whiteboard system. Preferably, such an improved eraser can be implemented in conjunction with a position-coding pattern, such as a dot pattern.

Briefly described, various embodiments of the present invention include an eraser assembly for an electronic display system having an electronic display surface. The eraser assembly indicates an area of the display surface for erasure. The eraser assembly comprises a body assembly, one or more eraser pads, and a sensing system.

The body assembly can comprise one or more eraser regions, such as a first eraser region and a second eraser region. The eraser regions are couplable to each other.

A first eraser pad is attached to the first eraser region, and a second eraser pad is attached to the second eraser region. The eraser pads are attached to the body assembly such that the eraser pads create an obtuse angle with respect to each other.

The body assembly can further comprise, or carry, one or more guards for preventing the user from tipping or angling the eraser pads against the display surface.

The sensing system is in communication with the body assembly, and is adapted to sense indicia of the eraser assembly's posture with respect to the display surface. For example and not limitation, the sensing system can include a sensing device for viewing a position-coding pattern on the display surface. A single sensing device can be used with multiple eraser pads, including both the first and second eraser pads.

These and other objects, features, and advantages of the present invention will become more apparent upon reading the following specification in conjunction with the accompanying drawing figures.

DETAILED DESCRIPTION

Figure 1:
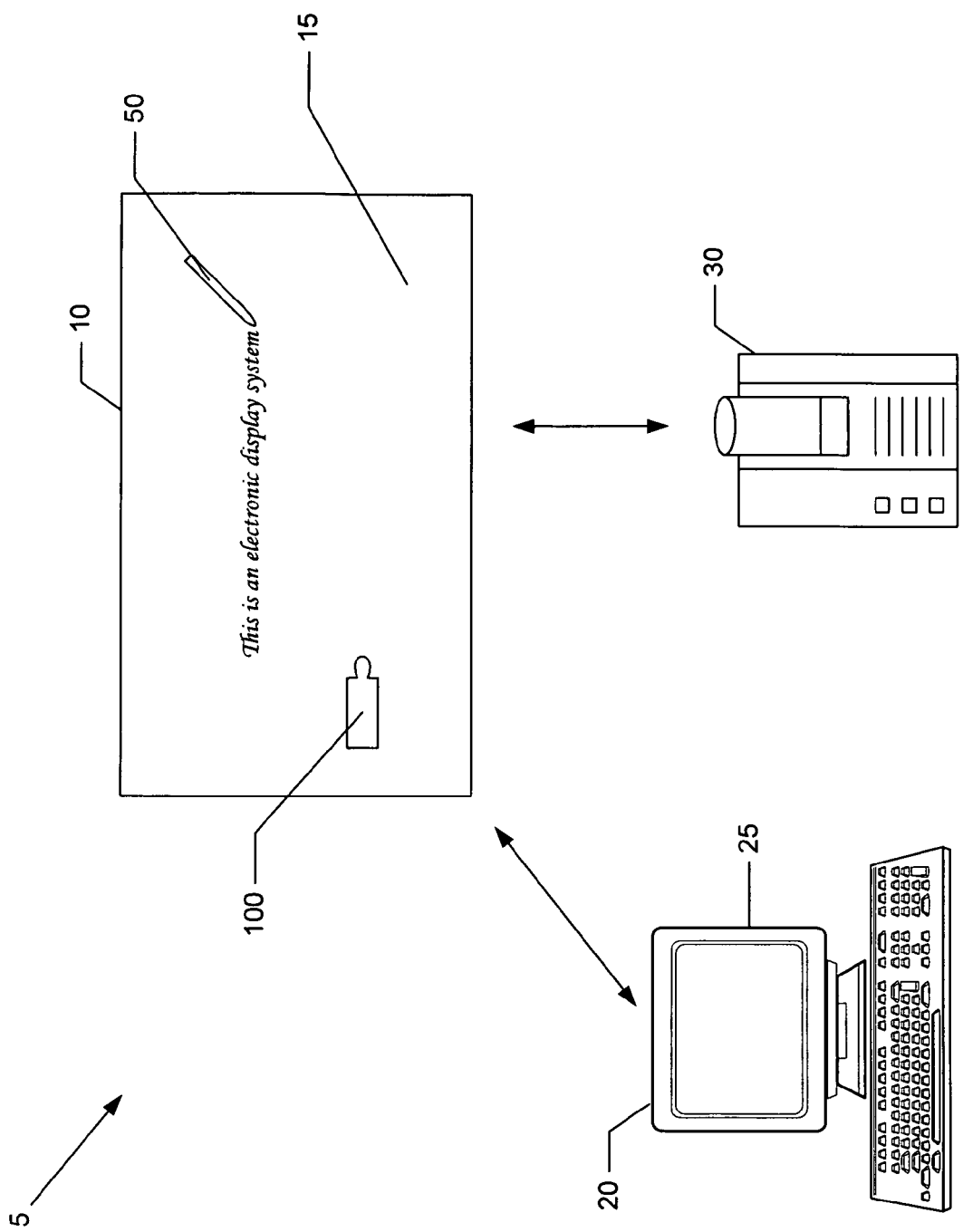
FIG. 1 illustrates an electronic display system, according to an exemplary embodiment of the present invention.

To facilitate an understanding of the principles and features of the invention, various illustrative embodiments are explained below. In particular, the invention is described in the context of being an eraser assembly for an electronic display system. Embodiments of the invention, however, are not limited to use in electronic display systems. Rather, embodiments of the invention can be used for erasure in many electronic writing or drawing systems.

The components described hereinafter as making up various elements of the invention are intended to be illustrative and not restrictive. Many suitable components that would perform the same or similar functions as the components described herein are intended to be embraced within the scope of the invention. Such other components not described herein can include, but are not limited to, for example, components that are developed after development of the invention.

Various embodiments of the present invention comprise eraser assemblies. Exemplary embodiments of the present invention can comprise a body assembly, one or more eraser pads, and a sensing system.

Referring now to the figures, wherein like reference numerals represent like parts throughout the views, the eraser assembly will be described in detail.

FIG. 1 illustrates an electronic display system 5, for example, an electronic whiteboard system, implementing the eraser assembly 100. The electronic display system 5 includes an electronic display device 10, such as an electronic display board, having a display surface 15. The electronic display system 5 further includes a processing device 20 and a projector 30.

The display board 10 is operatively connected to the processing device 20. The processing device 20 can be an integrated component of the display board 10, or the processing device 20 can be an external component. Suitable processing devices include a computing device 25, such as a personal computer.

The projecting device 30, such as a conventional projector, can project images from the processing device 20 onto the display surface 15. For example and not limitation, the projector 30 can project a graphical user interface or markings created through use of a digital writing device, such as a pen or stylus 50. The projecting device 30 can be in communication with the processing device 20. Such communication can be, for example, by means of a wired or wireless connection, Bluetooth, or by many other means through which two devices can communicate. The projecting device 30, however, can be excluded from the display system 5 if the display device 10 is internally capable of displaying markings and other objects on its surface 15.

The stylus 50 can transmit a signal to the processing device 20 that digital markings are to be projected onto the display surface 15 as indicated by the stylus 50. Additionally, the stylus 50 can be adapted to physically mark the display surface 15, for example, with dry-erase ink or some other removable marking material. The display surface 15 can be adapted to receive such physical markings. These markings, both digital and physical, of the stylus 50 can be adapted by the display system 5 for printing, storage, sharing, sending, or many other purposes.

The eraser assembly 100 can cause objects, such as markings, to be erased or blanked from the display surface 15. When objects are blanked, such objects are no longer visible on the display surface 15, but may or may not remain in memory of the processing device 20.

The eraser assembly 100 can be activated by many means, such as by an actuator, such as a switch or button, or by bringing the eraser assembly 100 in proximity to the display surface 15. While activated, placement or movement of the eraser assembly 100 on, or in proximity to, the display surface 15 can indicate to the processing device 20 that objects are to be removed from the display surface 15. Additionally, if the display surface 15 is adapted to receive removable markings, such as from the stylus 50, the eraser assembly 100 can be analogously adapted to physically erase such markings.

Figure 2A:
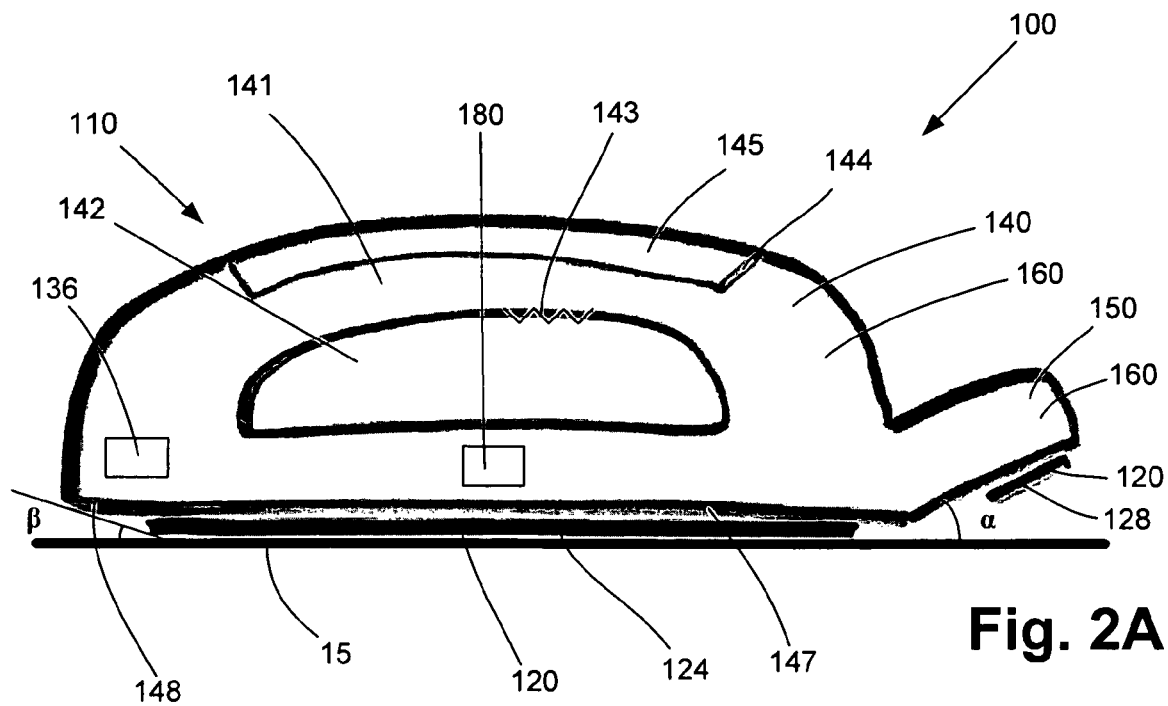
FIG. 2A illustrates a side, partial cross-sectional view of an eraser assembly, according to an exemplary embodiment of the present invention.
Figure 2B:
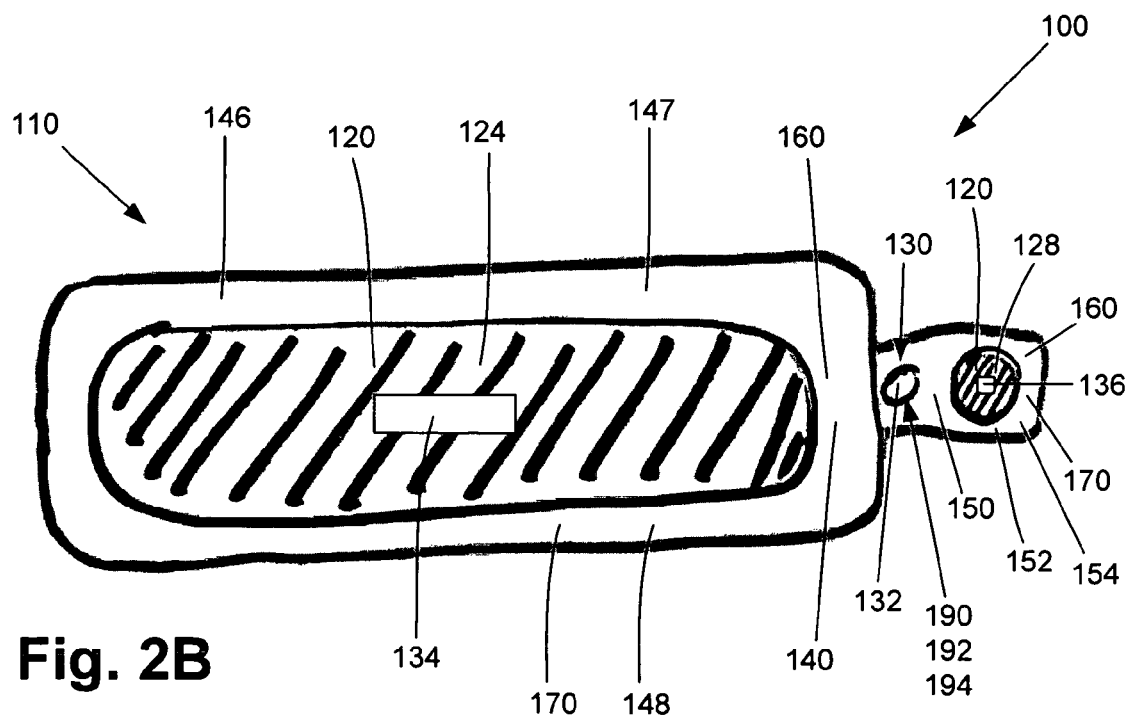
FIG. 2B illustrates an underside view of the eraser assembly, according to an exemplary embodiment of the present invention.
Figure 2C:
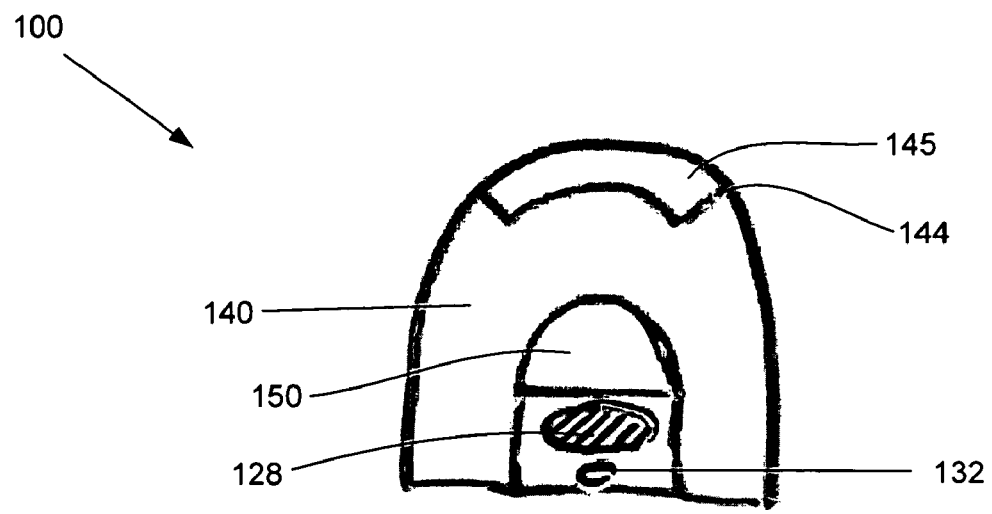
FIG. 2C illustrates a front view of the eraser assembly, according to an exemplary embodiment of the present invention.

FIGS. 2A-2C illustrate, respectively, side, underside, and front views of the eraser assembly 100. The eraser assembly 100 can comprise a body assembly 110, one or more eraser pads 120, one or more pad guards 170, and a sensing system 130.

Body Assembly

The body assembly 110 acts as a support and backbone for the eraser assembly 100. The body assembly 110 can be composed of many materials, including, but not limited to plastic, metal, or wood. Preferably, at least a portion of the body assembly 110 is comprised of a rigid material, such that a user can grip the body assembly 110 to guide the eraser along the display surface 15. Additionally, the body assembly 110 can be composed of multiple parts, or can be a single unsegmented component. As shown, the body assembly 110 can comprise one or more eraser regions 160, such as a body region 140 and a head region 150.

The body region 140, or body, and the head region 150, or head, each perform as eraser regions 160. Each eraser region 160 provided in the body assembly 110 can provide a means to erase. Further, each distinct eraser region 160 can indicate to the display system 5 a distinct set of parameters for erasure. For example, and not limitation, the head 150 indicates a smaller area of erasure than does the body 140. In addition to the head 150 and body 140, additional eraser regions 160 can be provided in the eraser assembly 100.

The body 140 can comprise a hand-hold 141 and a power-source compartment 144.

The hand-hold 141 enables secure and comfortable handling of the eraser assembly 100 during erasing. As shown in FIG. 2A, the body 140 can define a holding cavity 142, further defining the hand-hold 141 that the user can wrap a hand through. The holding cavity 142, however, is not required. For example, the hand-hold 141 can comprise a grip 143 additionally or alternatively to the holding cavity 142. If the hand-hold 141 is not provided, it is preferable, though not required, that the body 140 have an ergonomic shape for comfortable handling by the user.

The body 140 further defines a second cavity for use as a power-source compartment 144, and can further comprise a cover 145. The power-source compartment 144 houses a power source, such as one or more batteries, used to power the eraser assembly 100. When secured to the remainder of the body 140, the cover 145 can enclose the power source in the power-source compartment 144. Further, when secured, the cover 145 can form a generally flush surface with the remainder of the body 140. Additionally or alternatively, the eraser assembly 100 can be wired to a power source for powering the eraser assembly 100.

The head 150 can protrude from one end of the body 140, as shown. It is not required, however, that there be a distinct separation between the eraser regions 160, as with the head 150 protruding from the body 140. For example and not limitation, the body assembly 110 can comprise any polyhedron, with each face of the polyhedron representing a distinct eraser region 160.

Eraser Pads

As stated above, the eraser assembly 100 can additionally comprise one or more eraser pads 120. Each eraser pad 120 is analogous to a foam, pad, or cloth material that contacts the display surface 15 in a conventional non-electronic eraser. As the display surface 15 can be adapted to receive physical marking, such as from a dry-erase marker, the eraser pads 120 can be adapted to erase such physical markings. Accordingly, the eraser pads 120 can be composed of materials similar to those used with a conventional whiteboard. In other words, one or more eraser pads 120 can be composed of foam, pad, cloth, or many other materials capable of removing physical markings. Further, one or more eraser pads 120 can be treated with water or chemicals, such as a cleaning solution, for removing physical markings.

Alternatively, if the display system 5 is not adapted to receive physical marking on the display surface 15, then no physical erasure of such markings is required. In that case, the eraser pads 120 need not be composed of a conventional material, but can comprise many materials, such as wood or plastic. To emulate the feel and maintain a similar weight of a conventional eraser, however, the eraser pads 120 are preferably composed of conventional materials.

While many eraser pads 120 can be provided in the eraser assembly 100, preferably one eraser pad 120 is provided for each eraser region 160. Each eraser pad 120 can be in communication with a corresponding eraser region 160, and is preferably physically attached to such eraser region 160 by means of one or more adhesives, screws, nails, and the like.

Exemplarily, an eraser pad 120 is in use when it contacts, or is in sufficient proximity to, the display surface 15. Accordingly, the user can use an eraser pad 120 by moving its corresponding eraser region 160 in sufficient proximity to the display surface 15. When an eraser pad 120 is in use, erasing can occur with that eraser pad 120. The size and shape of an area erased can correspond to the general size and shape of the eraser pad 120 in use.

Two eraser pads 120 can be provided, a body eraser pad 124 and a head eraser pad 128. The body eraser pad 124 can be attached to a body pad surface 146 of the body 140. Likewise, the head eraser pad 128 can be attached to a head pad surface 152 of the head 150.

The eraser pads 120 can be many shapes and sizes. Preferably, provided eraser pads 120 differ in size, shape, or both. As shown, the head eraser pad 128 can be smaller than the body eraser pad 124. As such, the user can vary the area of erasure by switching between the body and head eraser pads 124 and 128.

Figure 3:
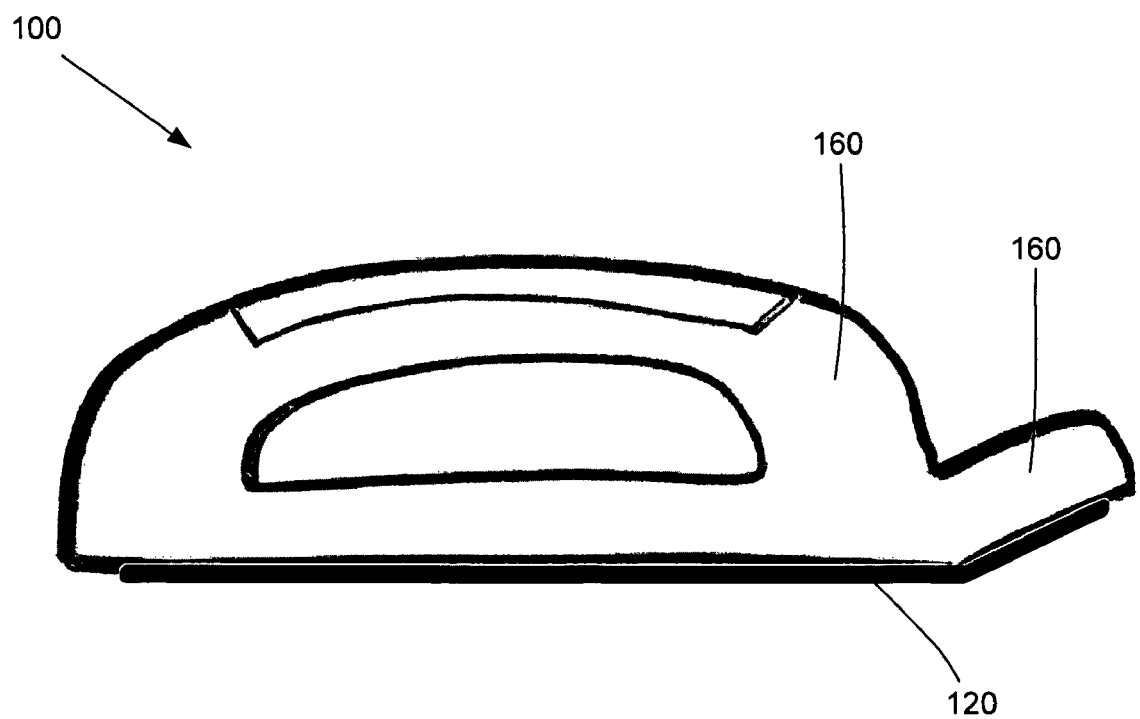
FIG. 3 illustrates a side view of the eraser assembly having a single eraser pad, according to an exemplary embodiment of the present invention.

Alternatively, a single eraser pad 120 can be provided, and can be directly attached to more than one eraser region 160. FIG. 3 illustrates this configuration. Preferably, the angle of the eraser pad 120 varies from one eraser region 160 to an adjacent eraser region 160. In other words, the single eraser pad 120 can be bent between eraser regions 160. As such, adjacent eraser regions 160 could not be used simultaneously for erasing because only one would be sufficiently proximate the display surface 15 at any instant.

Referring now back to FIGS. 2A-2C, the head eraser pad 128 can be set at many angles with respect to the body eraser pad 124. For example, when the body eraser pad 124 faces the display surface 15, that is, when the body eraser pad 124 is generally parallel to the display surface 15, the angle $\alpha$ between the display surface 15 and the head eraser pad 128 is an acute angle. Preferably, $\alpha$ is in the range of approximately 10 degrees to approximately 80 degrees. For example, in one embodiment, a can be approximately 25 degrees. To switch between use of the two eraser pads 124 and 128, the user can rotate the eraser assembly by approximately $\alpha$ toward the desired eraser pad 124 or 128.

Pad Guards

A pad guard 170 can, but need not, be provided as part of each eraser region 160. All or none of the eraser regions 160 can have pad guards 170. Alternatively, one or more eraser regions 160 can comprise pad guards 170, while one or more other eraser regions 160 do not.

As discussed previously, eraser tipping can cause negative effects on the display system 5. Pad guards 170 are adapted to reduce or prevent eraser tipping. To this end, a pad guard 170 can obstruct, block, or shield an eraser pad 120 from the display surface 15 when the eraser assembly 100 is undesirably tipped. This obstruction occurs when the eraser assembly 100 is tipped to such a degree that the eraser pad 120 is positioned at least a predetermined angle away from the display surface 15. Erasure cannot occur with a particular eraser pad 120 when a pad guard 170 prevents the eraser pad 120 from reaching the display surface 15.

Figure 4A:
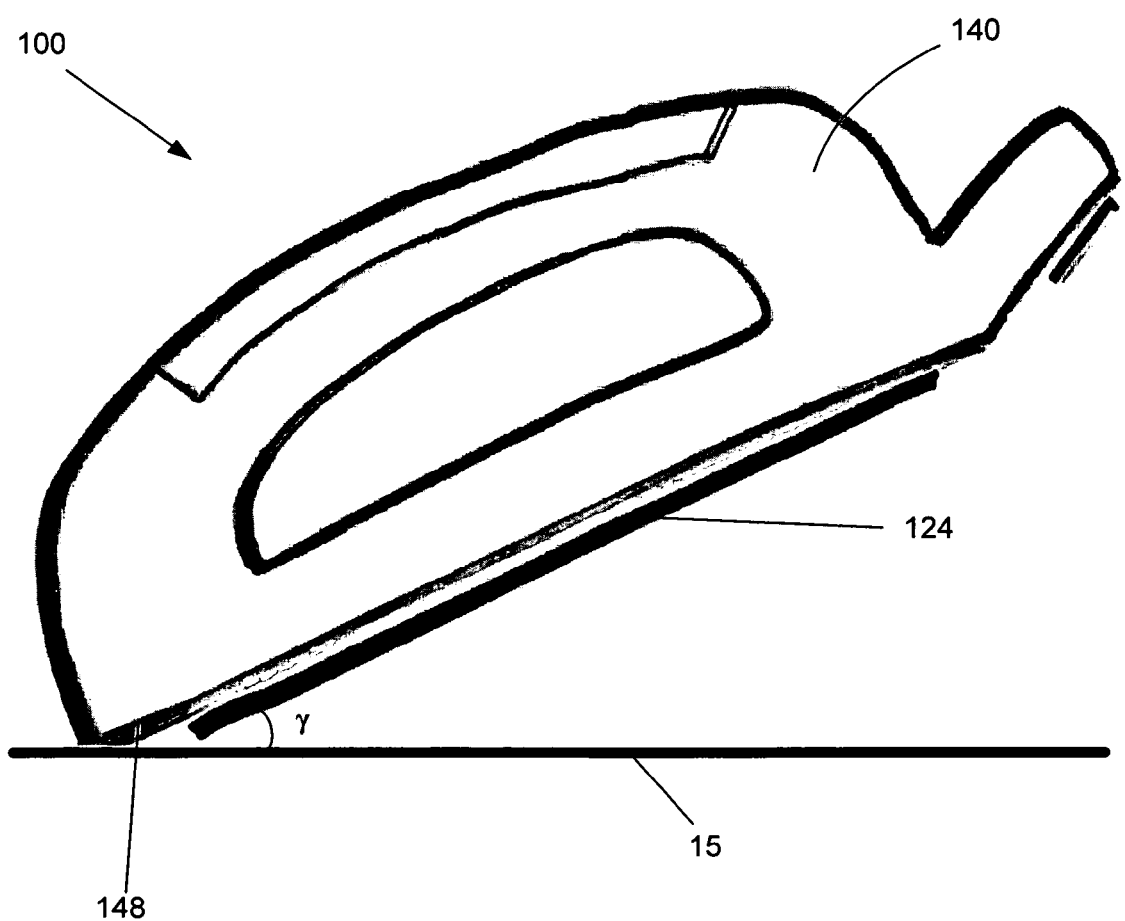
FIGS. 4A-4B illustrate side views of the eraser assembly tipped at angles, according to an exemplary embodiment of the present invention.

As shown in FIGS. 2A-2B, the body 140 can comprise or carry a body pad guard 148. The body pad guard 148 can prevent the body eraser pad 124 from contacting the display surface 15 when the body eraser pad 124 is tipped to at least a predetermined tipping angle $\beta$ with respect to the display surface 15. FIG. 4A illustrates the eraser assembly 100 when such tipping of the body eraser pad 124 occurs. As shown, the eraser assembly 100 and the body eraser pad 124 are tipped at angle $\gamma$ with respect to the display surface 15, where $\gamma$ is greater than $\beta$. As shown in FIG. 4A, the eraser pad 124 of the body 140 will not contact the display surface 15, and thus, the display system 5 can recognize that markings on the display surface 15 should not be erased or deleted.

Referring back to FIGS. 2A-2B, the body pad surface 146 can have a greater perimeter than does the body eraser pad 124. As such, an outer edge 147 of the body pad surface 146 extends outside the perimeter of the body eraser pad 124. The body pad guard 148 comprises this outer edge 147.

Figure 4B:
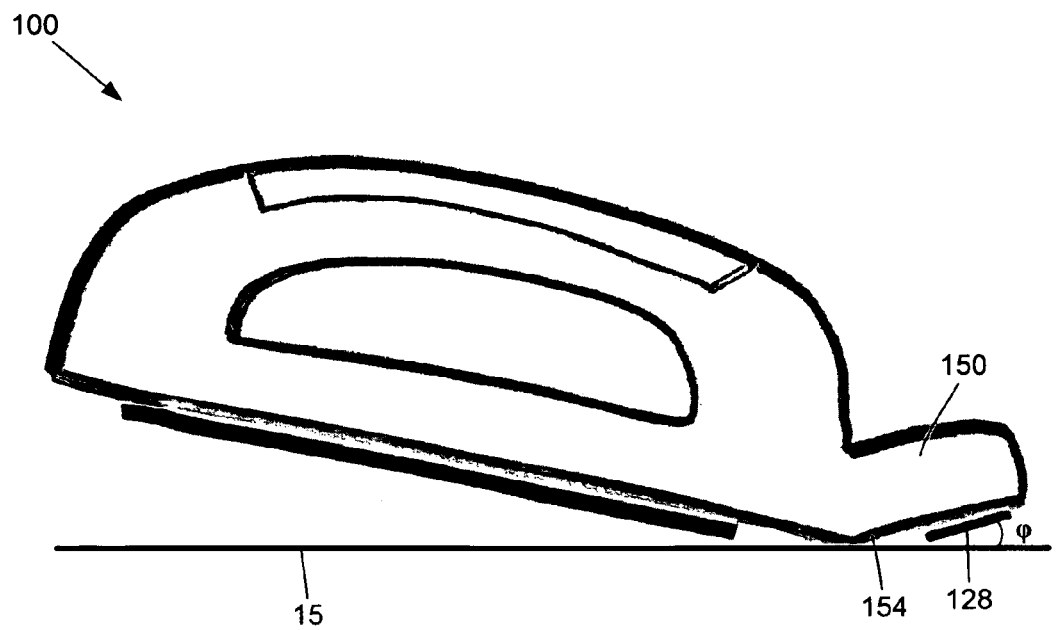

Likewise, the head 150 can comprise or carry a head pad guard 154. The head pad guard 154 can prevent the head eraser pad 128 from contacting the display surface 15 when the head eraser pad 128 is tipped to at least a predetermined tipping angle $\theta$ with respect to the display surface 15. FIG. 4B illustrates the eraser assembly 100 when such tipping of the head eraser pad 128 occurs. As shown, the eraser assembly 100 and the head eraser pad 128 are tipped at angle $\phi$ with respect to the display surface 15, where $\phi$ is greater than $\theta$. As shown in FIG. 4B, the eraser pad 128 of the head 150 will not contact the display surface 15, and thus, the display system 5 can recognize that markings on the display surface 15 should not be erased or deleted.

Referring again to FIGS. 2A-2B, the head pad surface 152 can have a greater perimeter than does the head eraser pad 128. As such, an outer edge 155 of the head pad surface 152 extends outside the perimeter of the head eraser pad 128. The head pad guard 154 comprises this outer edge 155.

Figure 5:
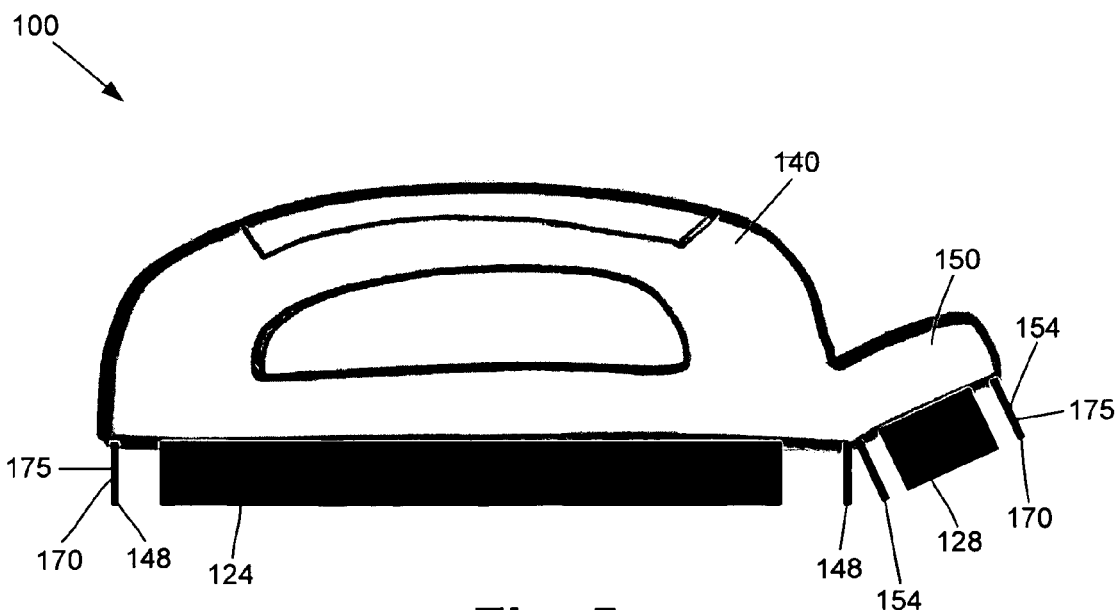
FIG. 5 illustrates a side view of the eraser pad having a guard, according to an exemplary embodiment of the present invention.

Alternatively, a pad guard 170, such as the body or head pad guard 148 or 154, can comprise a lip, cover, or many other physical barriers to prevent undesirable tipping of the eraser assembly 100. For example, FIG. 5 illustrates a ridge implementation of the body pad guard 148 and the head pad guard 154. A shown in FIG. 5, the body and head pad guards 148 and 154 can comprise ridges 175 for obstructing undesirable tipping of the eraser assembly 100.

Referring back to FIGS. 2A-2C, the tipping angles β and θ are determined by the distance the applicable pad guard 170 extends past the perimeter of the eraser pad 120 and by the distance the eraser pad 120 extends below the pad guard 170. An eraser pad 120 can have many thicknesses, and a pad guard 170 can have many widths. As a result, the tipping angles β and θ can vary between eraser regions 160 and, further, can vary around the perimeter of an eraser pad 120. In one embodiment, one or more of the resulting tipping angles β and θ are minimized, so that tipping is minimized.

Sensing System

The sensing system 130 can be coupled to, and in communication with, the body assembly 110. The sensing system 130 can have many implementations adapted to sense indicia of the posture of the eraser assembly 100 with respect to the display surface 15. For example, the sensing system 130 can sense data indicative of the distance of the eraser assembly 100 from the display surface 15, as well as the position, orientation, tipping, or a combination thereof, of the eraser assembly 100 with respect to the display surface 15.

The eraser assembly 100 has six degrees of potential movement. In the two-dimensional coordinate system of the display surface 15, the eraser assembly 100 can move in the horizontal and vertical directions. The eraser assembly 100 can also move normal to the display surface 15, and can rotate about the horizontal, vertical, and normal axes. These rotations are commonly referred to, respectively, as the roll, yaw, and tilt of the eraser assembly 100. The sensing system 130 can sense many combinations of these six degrees of movement.

The term "tipping" as used herein, refers to angling of the eraser assembly 100 away from normal to the display surface 15, and, therefore, includes rotations about the horizontal and vertical axes, i.e., the roll and the yaw of the eraser assembly 100. On the other hand, "orientation," as used herein, refers to rotation parallel to the plane of the display surface 15 and, therefore, about the normal axis, i.e., the tilt of the eraser assembly 100.

As shown, the sensing system 130 can include a first sensing device 132, a second sensing device 134, and a third sensing device 136. Each sensing device 132, 134, and 136 can be adapted to sense indicia of the posture of the eraser assembly 100. Further, each sensing device 132, 134, and 136 can individually detect data for determining the posture of the eraser assembly 100 or, alternatively, can detect such data in conjunction with other components, such as another sensing device.

To facilitate analysis of data sensed by the sensing system 130, the eraser assembly 100 can further comprise either or both of an internal processing unit 180 and a communication device 185. The internal processing unit 180 can process data detected by the sensing system 130. Such processing can result in determination of, for example: distance of the eraser assembly 100 from the display surface 15; position of the eraser assembly 100 in the coordinate system of the display surface 15; roll, tilt, and yaw of the eraser assembly 100 with respect to the display surface 15, and, accordingly, tipping and orientation of the eraser assembly 100.

The communication device 185 can transfer data to the processing device 20, and can accept data from the processing device 20. For example, if processing of sensed data is conducted by the processing device 20 instead of in the internal processing unit 180, the communication device 185 can transfer sensed data to the processing device 20 for such processing.

The first sensing device 132 can be a display sensing device adapted to sense the posture of the eraser assembly 100 based on properties of the display surface 15. The display sensing device 132 can be, or can comprise, a camera. The display sensing device 132 can detect portions of a pattern 200 (see FIGS. 6A-6C) on the display surface 15, such as a dot pattern or a dot matrix position-coding pattern. Detection by the display sensing device 132 can comprise viewing, or capturing an image of, a portion of the pattern 200.

The display sensing device 132 can be in communication with the body assembly 110 of the eraser assembly 100, and can have many positions and orientations with respect to the body assembly 110. For example, the display sensing device 132 can be positioned on, or housed in, the head 150, as depicted in FIGS. 2A-2C. Additionally or alternatively, the display sensing device 132 can be in communication with the head 150 or the body 140, or can positioned on, or housed in, the body 140 or other eraser regions 160 or portion of the body assembly 110.

As a result of the position of the display sensing device 132 between the body and head eraser pads 124 and 128, as shown, the display sensing device 132 can detect the display surface 15 regardless of which eraser pad 124 or 128 is in use. The display sensing device 132 can be directed normal to the head 150, such that the display sensing device 132 views the position-coding pattern generally straight-on when the head eraser pad 128 is in use, and generally at angle α when the body eraser pad 124 is in use.

As mentioned previously, the angle α is preferably less than 90 degrees. If α is 90 degrees or greater, then the display sensing device 132 would be unable to detect the display surface 15 during use of the body eraser pad 128, as the display sensing device 132 on the head 150 would then be directed away from the pattern 200 on the display surface 15. As a result, if α is 90 degrees or greater, a second display sensing device 138 (see FIGS. 7A-7B), such as a second camera, can be provided and oriented normal to the body eraser pad 124. From a complexity and economic standpoint, however, it may be desirable to provide a single display sensing device 132 in the eraser assembly 100.

The second and third sensing devices 134 and 136 can be contact sensors, such as a body contact sensor 134 and a head contact sensor 136. The body contact sensor 134 and the head contact sensor 136 can sense, respectively, when the body 140 and the head 150 come into contact with a surface, such as the display surface 15. The body contact sensor 134 can be in communication with the body eraser pad 124. The body contact sensor 134 can comprise, for example and not limitation, a switch that closes a circuit when the body eraser pad 124 contacts a surface with predetermined pressure. Similarly, the head contact sensor 136 can be in communication with the head eraser pad 128, and can comprise, for example, a switch that closes a circuit when the head eraser pad 128 contacts a surface. Accordingly, when the body or head eraser pad 124 or 128 contacts the display surface 15, the display system 5 can determine that erasure is indicated.

Various detection systems can be provided in the eraser assembly 100 for detecting the posture of the eraser assembly 100. For example, a tipping detection system 190 can be provided in the eraser assembly 100 to detect the angle and direction at which the eraser assembly 100 is tipped with respect to the display surface 15. An orientation detection system 192 can be implemented to detect rotation of the eraser assembly 100 in the coordinate system of the display surface 15. Additionally, a distance detection system 194 can be provided to detect the distance of the eraser assembly 100 from the display surface 15.

Figure 6A:
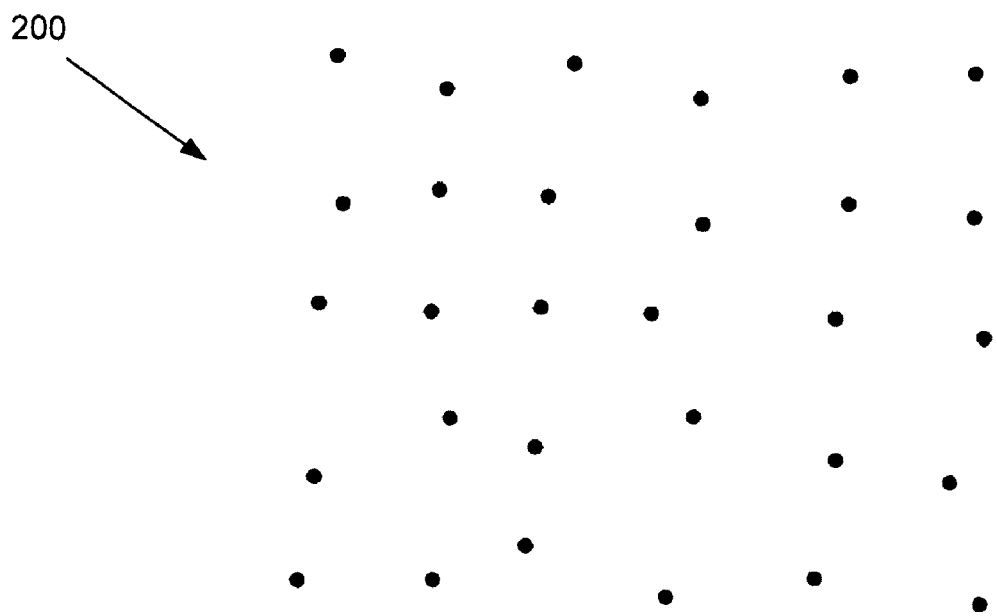
FIGS. 6A-6C illustrate various images of a pattern, as captured by a sensing device of the eraser assembly, according to an exemplary embodiment of the present invention.
Figure 6B:
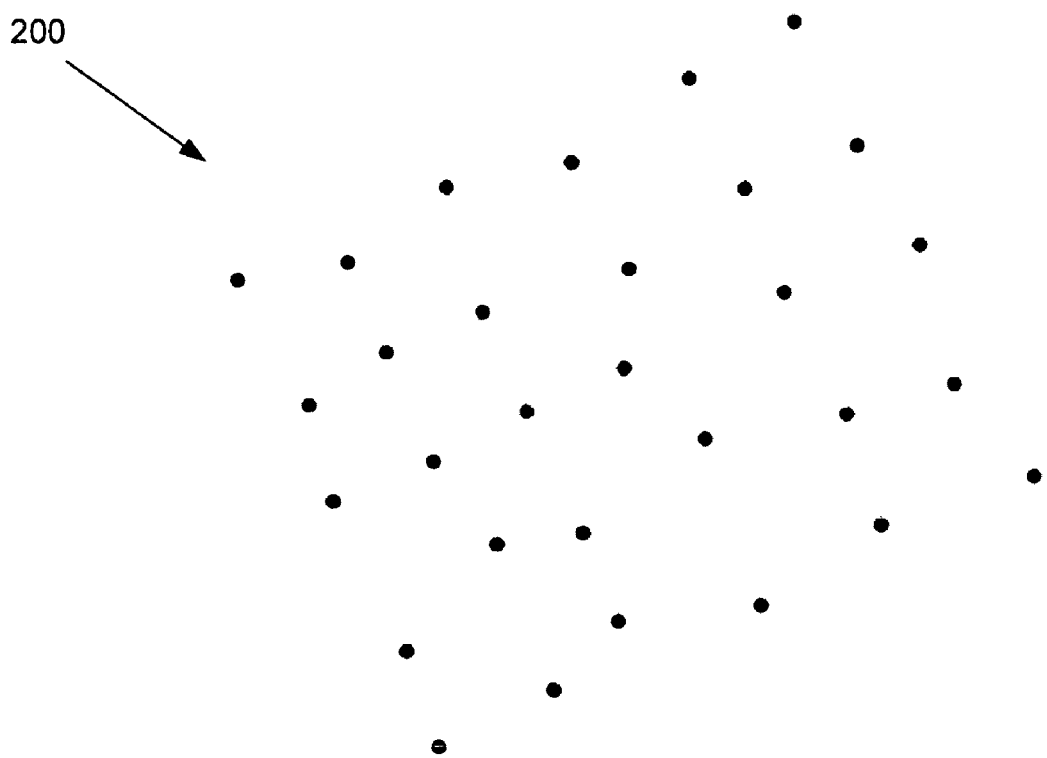
Figure 6C:
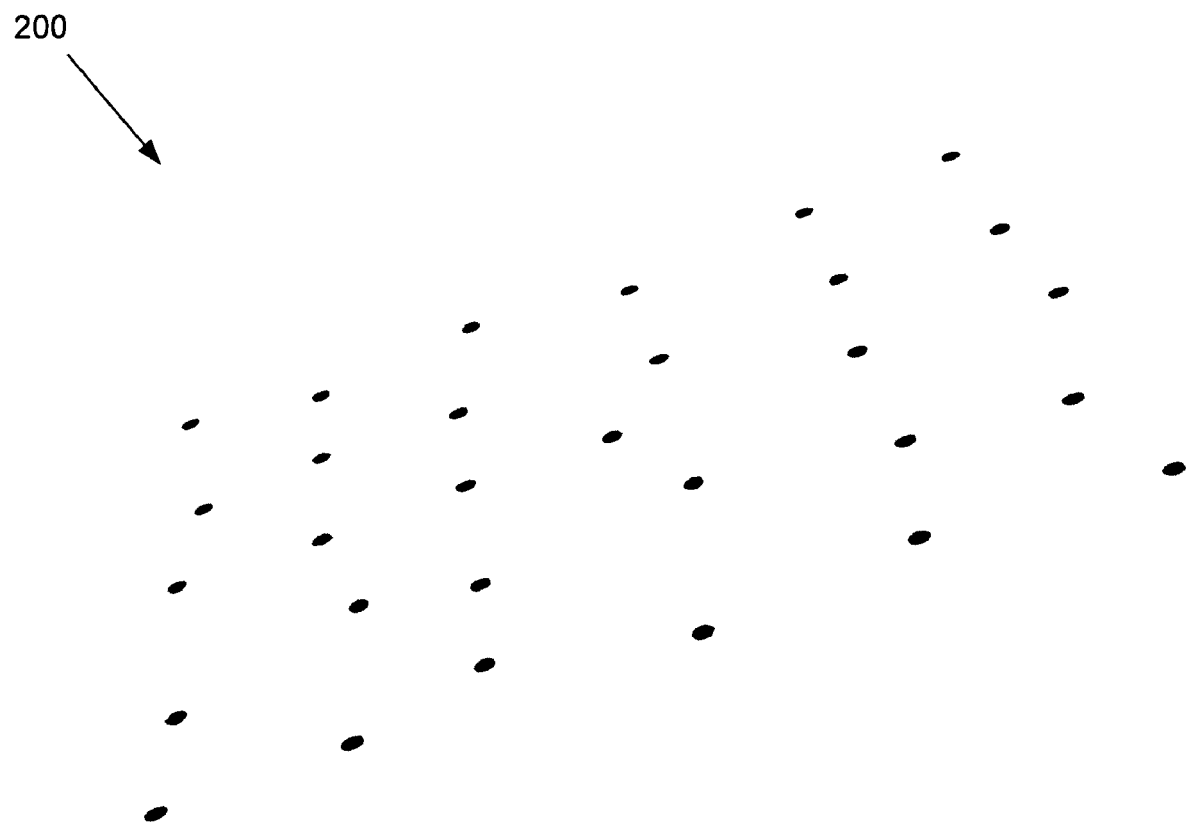

These detection systems 190, 192, and 194 can be incorporated into the sensing system 130. For example, the position, tipping, orientation, and distance of the eraser assembly 100 with respect to the display surface 15 can be determined, respectively, by the position, skew, rotation, and size of the appearance of the pattern 200 on the display surface 15, as viewed from the display sensing device 132. For example, FIGS. 6A-6C illustrate various views of an exemplary dot pattern 200 on the display surface 15. The dot pattern 200 serves as a position-coding pattern in the display system 5.

As previously discussed, determining an area of erasure can require calculating a number of variables, including the position of the eraser assembly 100 in the coordinate system of the display surface 15, tipping of the eraser assembly 100, and, in the case of a non-circular eraser pad 120, the orientation of the eraser assembly 100 in the coordinate system of the display surface 15. All of these variables can be determined by the view of the pattern 200 from the display sensing device 132.

FIG. 6A illustrates an image of the pattern 200, which is considered a dot pattern, as viewed at an angle normal to the display surface 15. For example, this is how the dot pattern 200 would appear from the display sensing device 132 when the head eraser pad 128 is in use, and when the display sensing device 132 is positioned on the head 150 and oriented, or rotated, normal to the head eraser pad 128. In the image, the dot pattern 200 appears in an upright orientation and not angled away from the display sensing device 132. When the display sensing device 132 captures such an image, the display system 5 can determine that the head eraser pad 128 is parallel to the display surface 15 and is in use.

As the eraser assembly 100 moves away from the display surface 15, the distance between the dots in the captured image decreases. Analogously, as the eraser assembly 100 moves toward the display surface 15, the distance between the dots appears to increase. As such, in addition to sensing the tipping and orientation of the eraser assembly 100, the display sensing device 132 can sense the distance of the eraser assembly 100 from the display surface 15.

FIG. 6B illustrates a rotated image of the dot pattern 200. A rotated dot pattern 200 indicates that the eraser assembly is rotated in the coordinate system of the display surface 15, about a normal axis of the display surface 15. For example, when a captured image depicts the dot pattern rotated at an angle of 30 degrees clockwise, it can be determined that the eraser assembly 100 is oriented at an angle of 30 degrees counter-clockwise. As with the image of FIG. 4A, this image was taken with the display sensing device 132 oriented normal to the display surface 15, so even though the eraser assembly 100 is rotated, the head eraser pad 128 is still in use.

FIG. 6C illustrates an image of the dot pattern 200 as viewed when the body eraser pad 124 is in use. The flattened image depicting dots angled away from the display sensing device 132 indicates that the display sensing device 132 is not oriented normal to the display surface 15. Further, the rotation of the dot pattern 200 indicates that the eraser assembly 100 is rotated as well. The image can be analyzed to determine the tipping angle and direction as well as the orientation angle. For example, it may be determined that the eraser assembly 100 is tipped downward 45 degrees, and then rotated 25 degrees. These variables determine an area to be erased. If it is determined that the tipping is approximately α degrees (see FIG. 2A) and approximately directly toward the body 140, then the body eraser pad 124 is parallel to the display surface 15 and, possibly, in use.

If, however, the calculated tipping angle and direction fall outside the ranges of the body and head eraser pads 124 and 128, it can be determined that the eraser assembly 100 is tipped away from the display surface 15, such that neither eraser pad 124 or 128 is facing and nearly parallel to the display surface 15. This could result from the user's attempt to eraser with a corner of an eraser pad 120. The tipping angle and direction can be used to determine whether and to what degree the eraser pad 120 in use is angled with respect to the display surface 15 and, therefore, what area is erased. Alternatively, tipping can be disallowed and, therefore, indicated to the user as an error through a vibrator, buzzer, flashing light, or other sound or signal emitted from the display system 5.

Accordingly, by analyzing images captured by the display sensing device 132, the display system 5 can determine whether erasure should occur and, if so, which eraser pad 120 is in use and at what distance and orientation. The display system 5 can then respond accordingly.

Figure 7A:
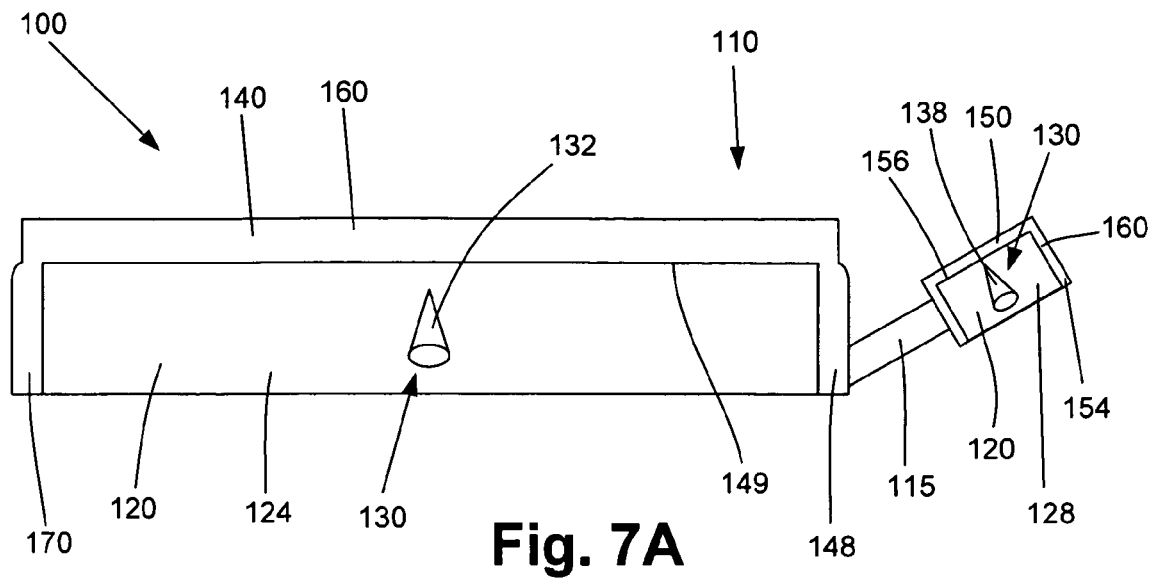
FIG. 7A illustrates a cross-sectional side view of the eraser assembly, according to an exemplary embodiment of the present invention.
Figure 7B:
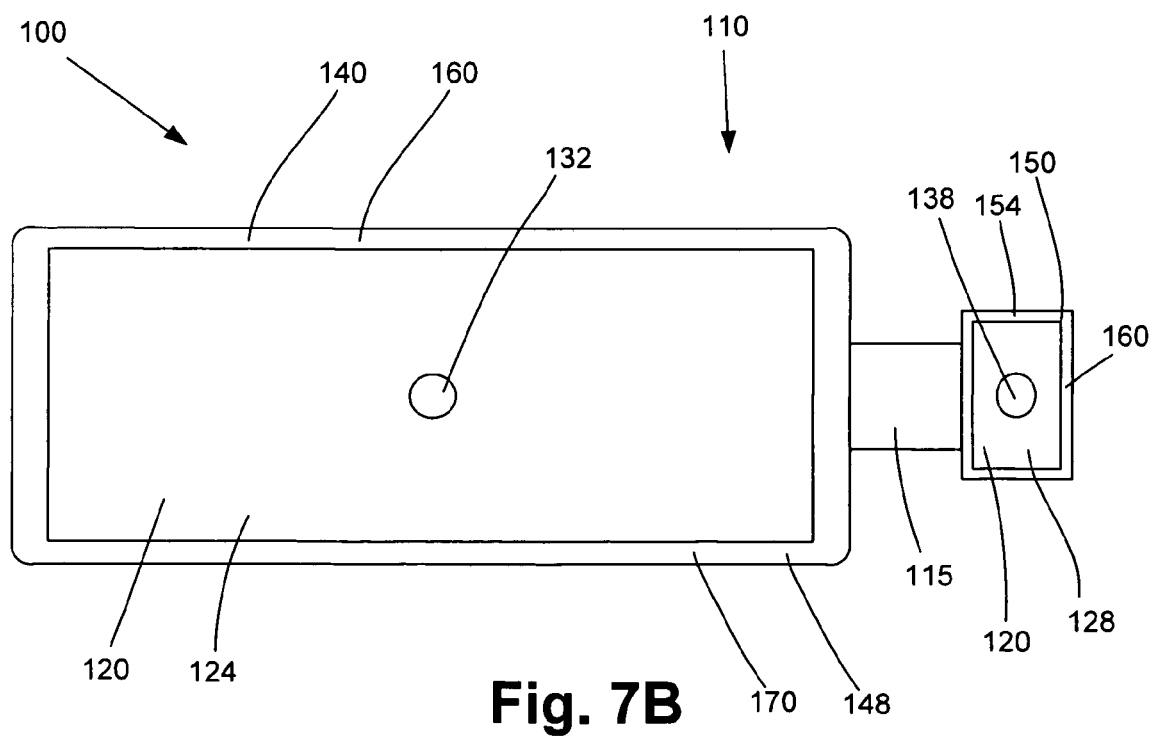
FIG. 7B illustrates an underside view of the eraser assembly, according to an exemplary embodiment of the present invention.

FIG. 7A illustrates a side cross-sectional view of another embodiment of the eraser assembly 100, and FIG. 7B illustrates an underside view of the eraser assembly 100.

Eraser pads 120, including body and head eraser pads 124 and 128, can be of many thicknesses. As shown in FIGS. 7A-7B, an eraser pad 120, such as the body or head eraser pad 124 or 128, can be embedded in its corresponding eraser region 160.

The body 140 can comprise a cutout 149 for receiving the body eraser pad 124. The body pad surface 146, to which the body eraser pad 124 is secured, can be a side of the cutout 149. Accordingly, the body eraser pad 124 can be disposed inside the body 140. The body pad guard 148 can comprise an outer edge of the body 140 surrounding the body eraser pad 124. If provided, the second display sensing device 138 can be embedded, or disposed, in the body eraser pad 124, as shown.

Likewise, the head 150 can comprise a cutout 156 for receiving the head eraser pad 128. The head pad surface 152, to which the head eraser pad 128 is secured, can be a side of the cutout 156. Accordingly, the head eraser pad 128 can be disposed inside the head 150. The head pad guard 154 can comprise an outer edge of the head 150 surrounding the head eraser pad 128. The display sensing device 132 can be embedded, or disposed, in the head eraser pad 128, as shown.

Additionally, a bridge 115 can be provided in the body assembly 110 for coupling and connecting the body 140 and the head 150.

Figure 8A:
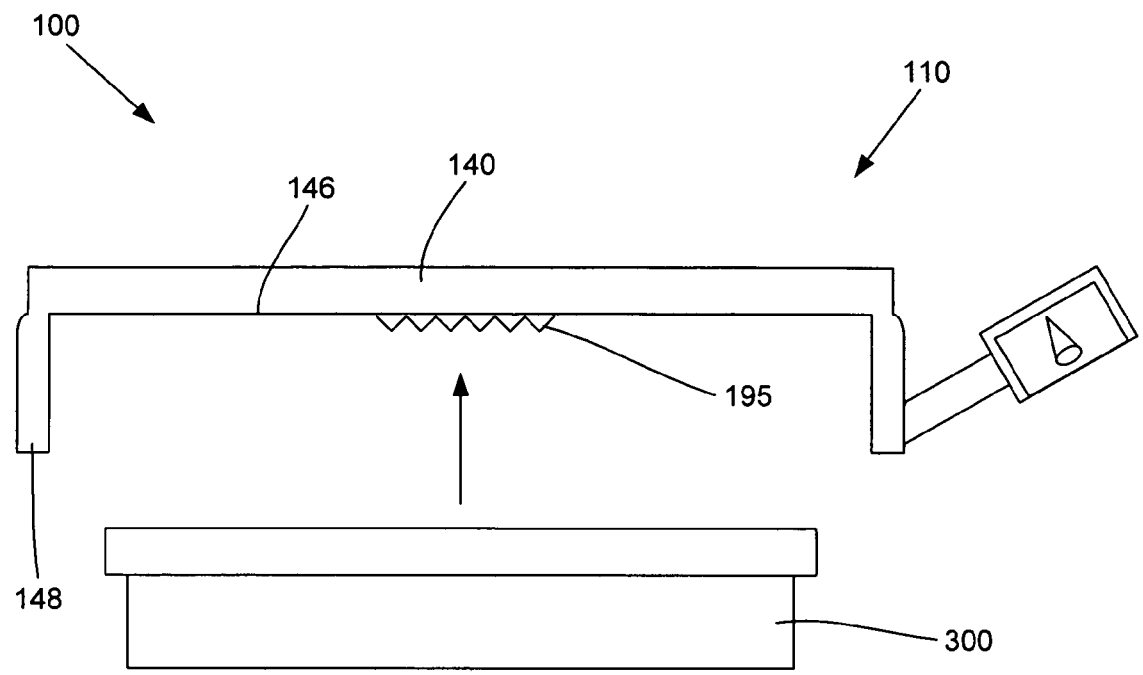
FIG. 8A illustrates a retrofit implementation of the eraser assembly, according to an exemplary embodiment of the present invention.
Figure 8B:
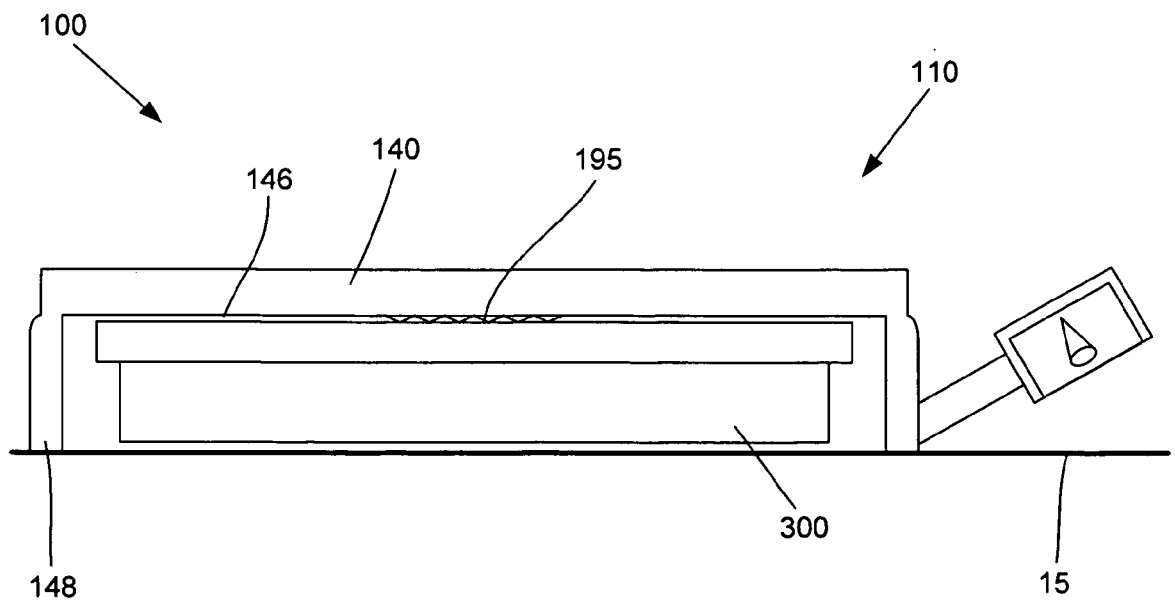
FIG. 8B illustrates the retrofit implementation of the eraser assembly coupled to a conventional eraser, according to an exemplary embodiment of the present invention.

The eraser assembly 100 can be adapted to utilize a conventional eraser in lieu of an eraser pad 120 and, thereby, retrofit the conventional eraser 300. FIGS. 8A-8B illustrate a retrofit implementation of the eraser assembly 100. FIG. 8A illustrates the eraser assembly 100 and a separate conventional eraser 300, while FIG. 8B illustrates the eraser assembly 100 secured to the conventional eraser 300.

As shown in FIGS. 8A-8B, the body eraser pad 124 need not be provided in the eraser assembly 100. A securing element 195 can be provided in the eraser assembly 100 to secure the conventional eraser 300 to the body pad surface 146 of the eraser assembly 100. In one embodiment, the securing element 195 is positioned on the body assembly 110, specifically on the body pad surface 146. The securing element 195 can include one or more of adhesives, Velcro, screws, nails, pins, and the like, and can secure the eraser assembly 100 to the conventional eraser 300. Accordingly, the conventional eraser 300 is adapted to interact with the display system 5 and to be used on the display surface 15.

The size of the body 140 can be adapted to fit at least a standard-size conventional eraser 300. To facilitate adaptation of conventional erasers 300 of various heights, the body pad guard 148 can be adjustable to accommodate shorter conventional erasers 300. For example and not limitation, the body pad guard 148 can be composed of a contracting material, such as a foam, such that when the body pad guard 148 is pressed against the display surface 15, the body pad guard 148 contracts, thereby allowing the conventional eraser 300 to contact the display surface 15. While a foam pad guard 170 would reduce tipping to some degree, the foam material could cause the pad guard 170 to be less effect than a pad guard 170 composed of a rigid material.

Figure 9:
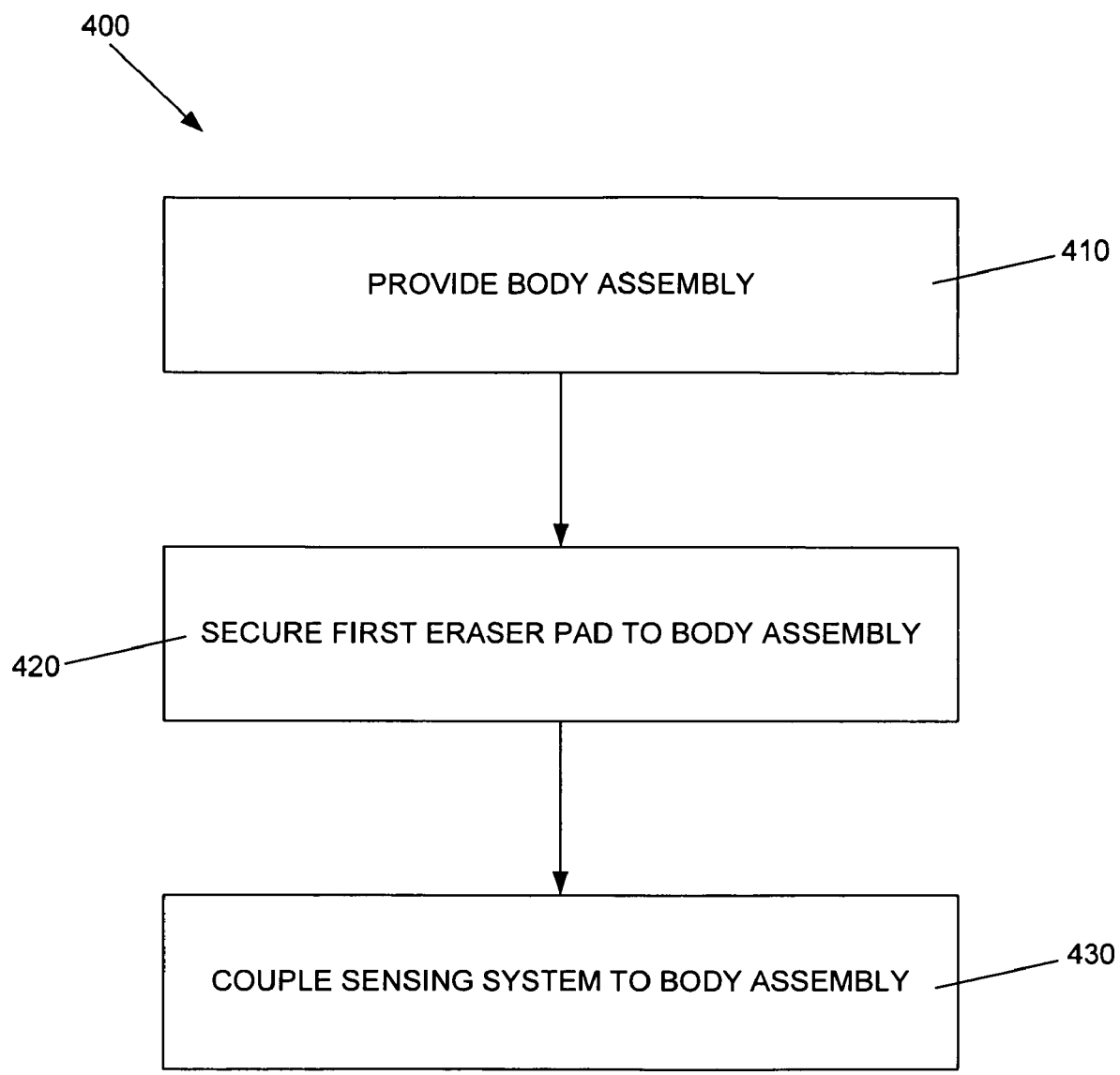
FIG. 9 illustrates a flow chart of a manufacturing process of the eraser assembly, according to a preferred embodiment of the present invention.

FIG. 9 illustrates a flow diagram of a manufacturing process 400 of the eraser assembly. Each box in FIG. 9 represents a sub-process of the overall manufacturing process. One skilled in the art would appreciate that the sub-processes illustrated in FIG. 9 need not be undertaken in the order illustrated, and one or more of the sub-processes can be segments of other sub-processes. Further, not all of the sub-processes illustrated need be undertaken for every embodiment of the manufacturing process, and additional sub-processes can be provided.

In an exemplary embodiment, the manufacturing process 400 comprises providing the body assembly 110 at 410. The body assembly 110 can comprise one or more eraser regions 160.

At 420, a first eraser pad 120 is secured to the body assembly 110. The first eraser pad 120 can be secured to one or more eraser regions 160. Additionally, other eraser pads 120 can be provided and secured to eraser regions 160 of the body assembly 110. Preferably, each eraser pad 120 is secured to a single eraser region 160.

At 430, a sensing system 130 can be coupled to the body assembly 110. The sensing system 130 can comprise a display sensing device 132, such as a camera, which can be housed in an eraser region 160 of the body assembly 110.

Additionally, one or more pad guards 170 can be provided around one or more eraser pads 120. And a second display sensing device 138, such as a second camera, can be provided in a second eraser region 160.

Figure 10:
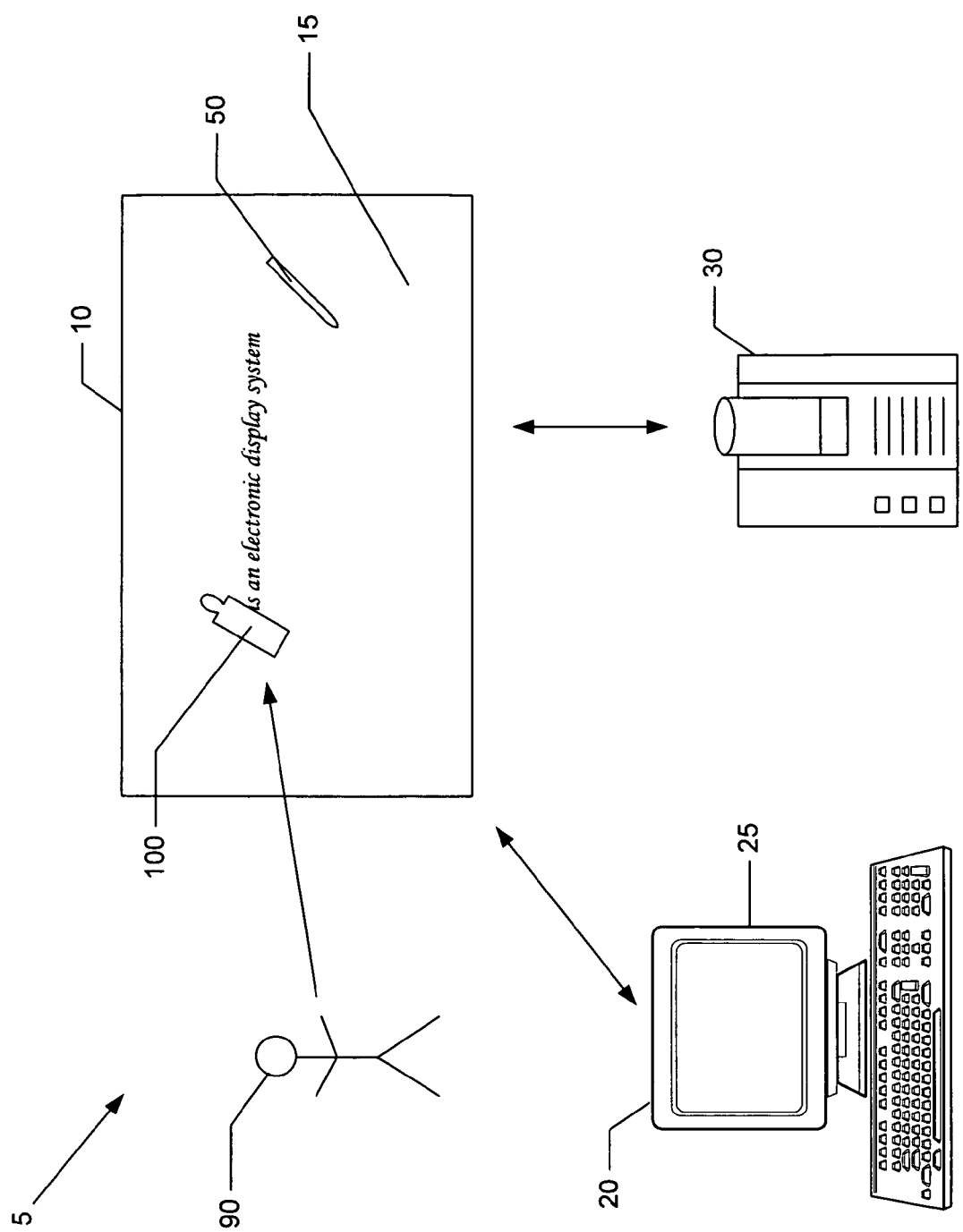
FIG. 10 illustrates a method of using the eraser assembly in the display system.

FIG. 10 illustrates a method of using the eraser assembly 100 in the display system 5. At a moment in time, the display surface 15 can display an image communicated from the processing device 20. If a projector 30 is provided, such image can be communicated from the processing device 20 to the projector 30, and then projected by the projector 30 onto the display surface 15. The image can include digital markings produced by the stylus 50, and the display surface 15 can further comprise physical markings produced by the stylus 50. Images and markings on the display surface 15 can be saved to electronic media, emailed, posted on the web, or archived in many ways, and can also be recalled for further editing.

In an exemplary embodiment, a user 90 can initiate erasure by bringing a portion of the eraser assembly 100 in sufficient proximity to the display surface 15, or by placing a portion of the eraser assembly 100 in contact with the display surface 15. To erase a swath of the display surface 15, the user 90 can move the eraser assembly 100 along the display surface 15. This movement can result in physical removal of physical markings on the display surface 15 and, through the electronic display system 5, removal of digital markings as well.

As the eraser assembly 100 travels along the display surface 15, the sensing system 130 periodically senses indicia of the changing posture of the eraser assembly 100 with respect to the display surface 15. These indicia are then processed by the display system 5. In one embodiment, the internal processing unit 180 of the eraser assembly 100 processes this data. In another embodiment, the data is transferred to the processing device 20 by the communication device 185 of the eraser assembly 100, and the data is then processed by the processing device 20. Processing of such data can result in determining the position, orientation, tipping, or a combination thereof, of the eraser assembly 100 and, thereby, can result in determining areas to be erased. If processing occurs in the internal processing unit 180 of the eraser assembly 100, the results are transferred to the processing device 20 by the communication device 185.

Based on determination of the relevant variables, the processing device 20 produces a revised image to be displayed onto the display surface 15. The revised image can exclude a set of markings previously displayed in the erased swath. The display surface 15 is then refreshed, which can involve the processing device 20 communicating the revised image to the optional projector 30. Accordingly, digital markings indicated by the eraser assembly 100 can be erased through the electronic display system 5. In one embodiment, this occurs in real time.

From the foregoing, it can be seen that the invention provides a number of different eraser assemblies 100.

For example, the eraser assembly 100 can comprise an eraser region 160 with attached eraser pad 120, and a sensing system 130 for sensing indicia of the posture of the eraser assembly 100.

The eraser assembly 100 can comprise an eraser region 160 with attached eraser pad 120, and a pad guard 170 for reducing tipping of the eraser assembly 100.

The eraser assembly 100 can comprise an eraser region 160 with attached eraser pad 120, a sensing system 130, and a pad guard 170.

The eraser assembly 100 can comprise an eraser region 160 with a tipping detection system 190 to detect tipping of the eraser assembly 100 with respect to the display surface 15.

The eraser assembly 100 can comprise a first eraser region 160, such as the body 140, and a second eraser region 160, such as the head 150. Each eraser region 160 can have an attached eraser pad 120, or a single eraser pad 120 can be attached to both eraser regions 160. Further, at least one of the eraser regions 160, such as the head 150, can be in communication with a sensing system 130.

The eraser assembly 100 can comprise a first eraser region 160, such as the body 140, a second eraser region 160, such as the head 150, as well as one or more eraser pads 120. Further, at least one of the eraser regions 160, such as the body 140, can include a pad guard 170.

The eraser assembly 100 can comprise a first eraser portion 160, such as the body 140, a second eraser portion 160, such as the head 150, as well as one or more eraser pads 120. Further, at least one of the eraser portions 160, such as the body 140, can include a pad guard 170.

One skilled in the art would recognize that the eraser assembly 100 need not be limited to the specific embodiments disclosed herein. That is, the eraser assembly 100 can include many combinations of these features, and can implement additional features as well.

The concepts described herein need not be limited to these illustrative embodiments. It would be appreciated by those skilled in the art that the eraser assembly 100 can be embodied in other specific forms without departing from the spirit or essential characteristics thereof.

The presently disclosed embodiments are, therefore, considered in all respects to be illustrative and not restrictive. The scope of the eraser assembly 100 is indicated by the appended claims, rather than the foregoing description, and all changes that come within the meaning and range of equivalents are intended to be embraced therein.

What is claimed is:

1. An eraser assembly for erasing a display surface of an electronic display system, the display surface comprising a pattern thereon, the eraser assembly comprising:
- a body assembly;
- a first eraser pad in communication with the body assembly;
- a second eraser pad in communication with the body assembly;
- a sensing device carried by the body assembly, the sensing device adapted to detect which of the first eraser pad and the second eraser pad is currently in use and further adapted to detect a position of the eraser assembly with respect to the display surface regardless of which of the eraser pads is in use.

2. The eraser assembly of claim 1, the sensing device comprising a camera for viewing the display surface, the camera being configured to view the display surface when the first eraser pad is in use and being further configured to view the display surface when the second eraser pad is in use.

3. The eraser assembly of claim 2, the camera adapted to view a dot pattern encoding two-dimensional coordinates on the display surface.

4. The eraser assembly of claim 3, further comprising an internal processing unit adapted to determine a position of the eraser assembly in a coordinate system of the display surface based on one or more images of the dot pattern captured by the camera.

5. The eraser assembly of claim 1, further comprising a first guard adapted to shield the first eraser pad from contacting the display surface when the first eraser pad is tipped past a predetermined angle with respect to the display surface.

6. The eraser assembly of claim 1, the second eraser pad being separable from the body assembly, and the body assembly being configured to receive and releasably secure the second eraser pad.

7. The eraser assembly of claim 1, further comprising a tipping detection system for detecting rotations of the eraser assembly about the horizontal and vertical axes of the display surface.

8. The eraser assembly of claim 1, further comprising an orientation detection system for detecting a rotation of the eraser assembly in a coordinate system of the display surface.

9. The eraser assembly of claim 1, further comprising a distance detection system for detecting a distance between the eraser assembly and the display surface.

10. The eraser assembly of claim 1, the second eraser pad being non-parallel to the first eraser pad.

11. The eraser assembly of claim 1, further comprising a communication device on or in the body assembly, the communication device configured to transmit a position-indicating signal to an external location, wherein the content of the position-indicating signal is dependent on the detected position of the body assembly with respect to the display surface.

12. An electronic whiteboard system comprising:
- an electronic whiteboard comprising a whiteboard surface; and
- an eraser assembly interactable with the electronic whiteboard, the eraser assembly comprising:
  - a body assembly;
  - a first eraser pad in communication with the body assembly;
  - a second eraser pad in communication with the body assembly and non-parallel to the first eraser pad;
  - an internal camera carried by the body assembly, the internal camera adapted to detect indicia which of the first eraser pad and the second eraser pad is currently in use and further adapted to detect indicia of a position of the eraser assembly with respect to the whiteboard surface regardless of which of the eraser pads is in use.

13. The electronic whiteboard system of claim 12, the whiteboard surface comprising a dot pattern encoding two-dimensional coordinates on the whiteboard surface.

14. The electronic whiteboard system of claim 13, the internal camera configured for viewing the dot pattern on the whiteboard surface.

15. The electronic whiteboard system of claim 14, further comprising an internal processing unit of the eraser assembly, the internal processing unit adapted to detect a position of the eraser assembly in a coordinate system of the whiteboard surface based on the dot pattern of the whiteboard surface, regardless of which eraser pad is currently in use.

16. The electronic whiteboard system of claim 15, the internal processing unit of the eraser assembly adapted to detect at least one of the roll, tilt, and yaw of the eraser assembly based on the dot pattern of the whiteboard surface.

17. The electronic whiteboard system of claim 12, the eraser assembly further comprising a tipping detection system adapted to sense tipping of the eraser assembly with respect to the whiteboard surface.

18. An eraser assembly for erasing a display surface of an electronic display system, the eraser assembly comprising:
- a body assembly comprising:
  - a first eraser region; and
  - a second eraser region coupled to the first eraser region;
- a first eraser pad attached to the first eraser region;
- a second eraser pad attached to the second eraser region, the second eraser pad set at an acute angle with respect to the display surface when the first eraser pad is parallel to and facing the display surface; and
- a camera configured to view the display surface when the first eraser pad is in use, to view the display surface when the second eraser pad is in use, and to detect indicia of a position of the body assembly.

19. The eraser assembly of claim 18, the camera further configured to view the display surface when the second eraser pad is in use.

20. The eraser assembly of claim 18, further comprising processing device configured to determine coordinates of a position of the eraser assembly in a coordinate system of the display surface when the first eraser pad is in use, based on one or more images captured by the camera.

21. The eraser assembly of claim 18, further comprising a first guard adapted to shield the first eraser pad from the display surface when the first eraser pad is tipped at greater than a predetermined angle with respect to the display surface.

22. The eraser assembly of claim 21, the first guard comprising an outer edge of the first eraser region, which outer edge extends past the perimeter of the first eraser pad.

23. The eraser assembly of claim 21, further comprising a second guard adapted to shield the second eraser pad from the display surface when the second eraser pad is tipped at greater than a predetermined angle with respect to the display surface.

24. The eraser assembly of claim 18, further comprising a first contact switch in communication with the first eraser pad, the first contact switch for detecting when the first eraser pad contacts a surface.

25. The eraser assembly of claim 24, further comprising a second contact switch in communication with the second eraser pad, the second contact switch for detecting when the second eraser pad contacts a surface.

26. A method of manufacturing an eraser assembly for erasing a display surface of an electronic display system, the display surface implementing a dot pattern, the method comprising:
- providing a body assembly;
- securing a first eraser pad to the body assembly;
- securing a second eraser pad to the body assembly, the second eraser pad set at an acute angle with respect to the display surface when the first eraser pad is parallel to and facing the display surface; and
- coupling a first camera to the body assembly, the first camera adapted to view the display surface when the first eraser pad is in use, adapted to the view the display surface when the second eraser pad is in use, and adapted to detect indicia of a position of the body assembly.

27. The method of claim 26, further comprising providing a guard adapted to shield the first eraser pad from the display surface when the first eraser pad is tipped past a predetermined angle with respect to the display surface.

28. The method of claim 26, further comprising providing a tipping detection system in communication with the body assembly.

* * * * *